3,138,626
CARBOXYLATION WITH $CO_2$ IN THE PRESENCE OF $AlCl_3$ AND Al OR Zn
John D. Calfee and Oliver de S. Deex, Dayton, Ohio, assignors to Monsanto Company, a corporation of Delaware
No Drawing. Filed Oct. 3, 1960, Ser. No. 59,860
19 Claims. (Cl. 260—448)

This invention is directed to the carboxylation of monocyclic aromatic compounds in the presence of aluminum particles and aluminum chloride, $AlCl_3$.

An object of this invention is the nuclear carboxylation of aromatic compounds with carbon dioxide, $CO_2$, in the presence of aluminum metal particles and $AlCl_3$ to attain markedly increased yields.

Another object of this invention is a method of carboxylating aromatic nuclei with dry carbon dioxide in the presence of anhydrous aluminum chloride and particulate aluminum metal flakes at superatmospheric pressures to attain high yields of aromatic acids.

A further object of the instant invention is to catalytically prepare aromatic monocarboxylic acids by carboxylating one of the ring carbon atoms of a mono-cyclic aromatic nucleus with carbon dioxide in the presence of aluminum chloride and metallic aluminum powder.

A still further object of the instant invention is a method for preparing monocarboxylic acids by direct carboxylation of mono-cyclic aromatic nuclei with carbon dioxide in the presence of aluminum halide and finely divided metallic particles of metals which react with HCl but do not react with the aluminum halide employed.

Another object of the instant invention is the preparation of monocarboxylic aromatic acids in increased yield by direct carboxylation of monocyclic aromatic nuclei at moderate pressures. Other objects will be apparent from the specification.

It is known that aluminum chloride ($AlCl_3$) will catalyze the nuclear carboxylation of aromatic nuclei by carbon dioxide. The yields attained from this reaction are low however, ranging from about 5% at atmospheric pressure to 15 or 20% at higher pressures depending at least in part upon the purity of the aluminum chloride employed, the pressure at which the carboxylation reaction is run, and other reaction variables some of which are already described in the literature. It has been observed in the prior art that the yield of the aromatic acid can be increased by employing superatmospheric pressures during reaction. When this is done, however, there results increased production of di-aryl keto derivatives, which constitute an impurity in the desired product and require costly separation procedures in order to isolate the aromatic acid. We have discovered that the addition of aluminum metal to the prior art aluminum chloride catalyzed carboxylation procedure causes a substantial increase in acid yield. We have also found that carbon dioxide reacts with monocyclic aromatic compounds in the presence of anhydrous aluminum chloride especially well when the aluminum metal is added in finely divided form. The apparent course of the reaction is first the formation of an alumino-chloride salt which is then hydrolyzed to the corresponding monocyclic aromatic acid. It is of great importance to arrive at a method wherein the percentage yield of the aromatic acid is increased while at the same time little or no diaromatic keto derivative is formed. The yields from the reaction employing $AlCl_3$ alone range from about 5% at 1 atmosphere to about 15% or 20% at 200 atmospheres (based on $AlCl_3$), but the addition of aluminum metal to the reaction mixture most surprisingly results in yields (based on $AlCl_3$) of about 23% of the aromatic acid at 1 atmosphere of pressure and about 55–60% at around 200 atmospheres of pressure. Thus it is seen that the yields of the aromatic acid at atmospheric pressure are increased over fourfold as compared to the corresponding yields when no aluminum metal is employed, and at higher pressures the yield is increased in some cases in excess of 250% of the prior art processes which employ aluminum chloride as the sole catalyst.

The exact theoretical explanation for the improved results is not known, but it is possible that the aluminum metal is a "scavenger" for the by-product HCl which is produced during the aluminum chloride catalyzed reaction. Also it is suggested that the aluminum metal may lead to the formation of a benzene-$AlCl_3$—$CO_2$—$AlCl_3$ complex which could then compete with the benzene-$AlCl_3$—HCl complex, and cause a greater production of the acid salt, which can then be hydrolyzed to the corresponding monocarboxylic aromatic acid.

The explanation may also be that a surface effect, i.e., heterogeneous surface catalysis, is obtained. Since the prior art procedure results in customarily low yields, the present invention, which increases the yield from 2 to 4 times that previously obtainable, constitutes a truly significant advance in the art of producing aromatic acids by the direct carboxylation route. The expression "direct carboxylation" as used herein is intended to denote placement of a [COO]— (viz. carboxyl) group directly onto a carbon atom which forms a part of the benzene ring. Such carbon atoms are often referred to in the art as "ring carbon atoms." It is to be understood that the invention is not dependent upon, nor is it limited by, this or any other theory as to the operation thereof. The invention is limited only by the claims appended hereto. However it is known from experimental data that an excess of HCl if present during the carboxylation reaction, will in some manner interfere with the production of the aromatic acid salt (to be later hydrolyzed to the corresponding aromatic acid) and will lead to diaryl ketone formation.

The equations which follow offer a convenient notation as to the manner in which the reaction may be pictured.

Equations:

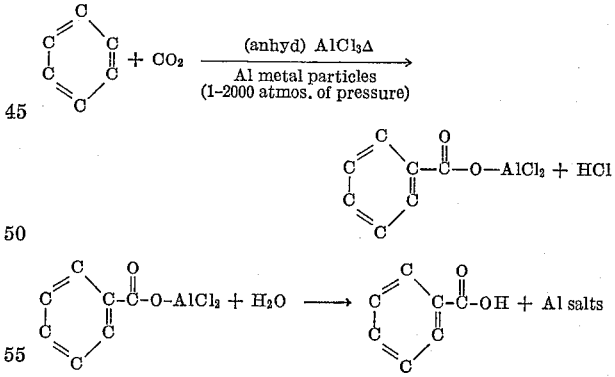

This behavior of the finely divided aluminum particles in greatly enhancing the percentage yield is wholly novel and unexpected. The addition of aluminum particles results in an overall increase in yield both when the carboxylation is run at atmospheric pressure and at higher pressures. Another significant advantage of the instant invention is that the yield of the aromatic acid increases with the increase in pressure while at the same time little or no contaminating ketone is formed. In the direct carboxylation process wherein aluminum chloride is the sole catalyst, the use of higher pressures causes a marked rise in diaromatic ketone formation (note Journal of General Chem. (USSR), vol. 22 (1952), pages 1388 et seq.).

This behavior of aluminum metal is truly catalytic, and cannot be fully explained in terms of the total amount of aluminum present during reaction. By this it is meant that the process according to the instant invention leads to the production of a higher yield of aromatic acid than would be expected even if the added aluminum metal is treated as $AlCl_3$ in calculating yield.

NATURE OF THE AROMATIC STARTING MATERIAL

The aromatic compound, from which the desired monocyclic aromatic acid is produced, must be monocyclic; i.e., it must contain only one benzene ring. Monocyclic aromatic hydrocarbons are eminently suitable as starting materials in the process according to the instant invention. The aromatic moiety can be substituted in one or more positions by alkyl groups. The lower alkyl substituents, vis., those having 1 to 6 carbon atoms, are quite satisfactory in this regard.

The aromatic compound can also be substituted in one or more positions by halogen substituents, viz., chlorine, bromine, iodine, and fluorine. The monocyclic monohalogenated aromatic compounds are preferred although polyhalogen substituted monocyclic aromatic compounds such as a dihalogenated benzenes and non-symmetrical, dihalogenated, monoalkyl substituted benzenes can be employed. To obviate reduction in yield the use of symmetrically substituted monocyclic aromatic compounds, viz., tri-substituted benzenes having substituents at the 1,3,5 or 2,4,6 positions (whether these substituents are alkyl groups, halogens, or a mixture of alkyls and halogenc) should probably be avoided as they tend to create steric hinderance.

As exemplary of suitable monocyclic aromatic compounds which can be carboxylated according to the present invention, the following can be named: benzene, toluene, xylene (dimethyl benzene), ethyl benzene, n-propylbenzene, iso-proplybenzene, n-butylbenzene, iso-butylbenzene, tert-butylbenzene, and mono and poly halogenated derivatives of each of the above-named hydrocarbons, e.g., chlorobenzene, bromotoluene, ortho-dichlorobenzene, meta-dibromotoluene (2,6-dibromotoluene), etc.

ALUMINUM HALIDE

Aluminum chloride ($AlCl_3$) is highly effective as the metal halide, but aluminum bromide ($AlBr_3$) may be employed. As the metal particulate catalyst, any metal which does not react with $AlCl_3$ but does react with HCl can be employed. Aluminum metal has given the best results by far; however, other metals can be employed, e.g., zinc, iron, etc. Alumina, $Al_2O_3$, can be used in place of aluminum metal; however, the alumina is not nearly as efficient in the attainment of high yields as the aluminum metal, per se.

REACTION CONDITIONS

The direct carboxylation synthesis of monocyclic aromatic acids according to the present invention lends itself to a wide variation in pressure and temperature conditions. Pressures of 1 to 3000 or more atmospheres can be used. The preferred pressures to be employed, due to overall safety factors and cost considerations, range from 100 to 400 atmospheres. The more preferred pressures range from 100 to 300 or so atmospheres of pressure. In general an increase in pressure will result in yield increase. As suitable temperature conditions for carrying out the carboxylation procedure, temperatures of about 25° to about 250° C. can be employed with temperatures of 90° to 120° C. being the more preferred temperatures. As regards the proportional amounts of reactants and catalysts to be employed, they can be used in equimolar ratios or an excess of any one of carbon dioxide, aromatic compound, $AlCl_3$, or finely divided metal can be used. The metallic particles can be amalgamated although this is not preferred. The size of the metal particulate catalyst can be varied from relatively large pieces, e.g., 30 mesh or even larger to truly diminutive pieces, e.g., 10 to 30 micron size, while still preserving the advantageous aspect of increased yield and inhibiiton of diaromatic ketone formation. However the use of extremely finely divided paint grade "pigment-sized" metal flakes or powder is preferred. The following table will serve to illustrate the effect of the physical size of the metal and the mole ratio of metal to aluminum chloride upon yield.

*Table I*

| Mols Al/Mol AlCl₃ | Physical Form and Size of Aluminum | Percent yield of p.toluic acid [1] | Percent yield of benzoic acid [1] |
|---|---|---|---|
| 0 | 20 micron powder (Alcoa)[2] | 23 | |
| 0.25 | 20 micron powder (Alcoa)[2] | 32 | |
| 0.50 | do[2] | 51 | |
| 0.50 | Paint grade pigment flakes (Merck). | 53 | |
| 0.50 | 30 mesh (amalgamated) | 53 | |
| 1.0 | 20 micron powder (Alcoa)[2] | 61 | |
| 0.24 | do[2] | | 39 |
| 0.50 | Paint grade pigment flakes (Merck). | | 51 |

[1] Based on $AlCl_3$.
[2] Alcoa atomized 101 aluminum powder.

The procedure for the experiments recorded in the above table involved the use of anhydrous aluminum chloride, aluminum metal, and either toluene or benzene, as indicated by the product. The direct carboxylation procedures were run at 100° C. using dry carbon dioxide gas and a pressure of 200 to 300 atmospheres.

As previously noted in the process according to the present invention an increase in pressure is accompanied by an increase in yield. The effect of increases in pressure on the procedures both with and without the use of aluminum can be illustrated by the following table.

*Table II*

| Pressure (atmospheres) | Mols Al (powder)/mol AlCl₃ | Percent yield of p.toluic acid [1] |
|---|---|---|
| 1 | 0.0 | 5 |
| 1 | 1.0 | 23 |
| 200 | 0.0 | 22 |
| 200 | 1.0 | 61 |
| 2,200 | 0.0 | 25 |

[1] Based on $AlCl_3$.

The process of the present invention can be conducted under any of the various conditions recognized in the art as suitable for Friedel-Crafts reactions in general. The reaction can be allowed to run for any desired length of time to reach the desired conversion. Thus the reaction time can vary from less than one hour to several days with the shorter reaction periods generally resulting in lower yields and conversions.

As it is customary in most Friedel-Crafts reactions, moisture should be excluded. Thus the aluminum halide catalyst, e.g., aluminum chloride, should be thoroughly dried and employed in the anhydrous condition for best results. The reaction time can vary from an hour or so up to about 24 hours. The best opeartive lengths of time for the reaction will depend in part, of course, upon the specific temperatures and pressures chosen for the direct carboxylation. It is most advisable to allow the direct carboxylation reaction to proceed to completion, prior to the hydrolysis step. With the use of moderately high pressures, e.g., 200 to 300 atmospheres, and temperatures of about 100° C., it is generally sufficient to react the materials for a period of about 3 to 4 hours. No particular sequence of addition of the reactants is required in order to attain the increased yields of the present invention. It is advisable however that the aluminum halide ($AlCl_3$), metallic particulate material (aluminum) carbon dioxide, and aromatic (e.g., benzene, toluene, etc.) be reacted in the presence of one another for the greater portion of the reaction time. Generally the aluminum chloride, aluminum metal, and the aromatic compound will be added to the reaction vessel prior to the introduction of carbon dioxide. All of the reactants should be in a substantially dry state, and for this reason the use of dry $CO_2$ in gaseous form is preferred.

HYDROLYSIS AND SEPARATION PROCEDURE

After the reaction has proceeded to completion or the desired conversion has taken place, the reaction products are poured onto an ice-HCl mixture. This results in the formation of an organic layer and an aqueous layer. The aqueous layer can, if desired, be extracted with diethyl ether and the ether extracts added to the previously secured organic layer to form a combined organic layer. The aqueous layers remaining after the ether extractions are then discarded. If no ether extraction is performed, the aqueous layer is thrown away and the organic layer is retained. The retained organic layer is then subjected to repeated washings with water, and the aqueous layers resulting therefrom are discarded while the organic layers are kept. Following these washings a solution of a basic substance e.g., $Na_2CO_3$, $NaHCO_3$, weak caustic, or any other suitable basic reagent is added to the said organic layer(s). This neutralization results in the formation of two layers, one organic layer and one basic-aqueous layer. The organic layer is discarded whereas the aqueous layer is retained. The aqueous layer is then acidified with a "precipitating" acid such as hydrochloric acid, sulfuric acid, or any suitable acid. This results in the isolation of the desired monocyclic aromatic acid. The use of the acid in strengths of 2 N or higher is preferred although acid of any acidic normality can, of course, be used. If acid of low strength, e.g., 3 N or 4 N is selected, naturally more acid will be required than if an acid of a stronger concentration is used.

In general no special conditions need be observed in the hydrolysis step except that an acid hydrolysis is preferred since the aluminum and aluminum salts are soluble in acid medium. The use of cold water, which may be attained by any means sufficient to chill the temperature of the water such as ice or mechanical refrigeration, is preferred although by no means mandatory. Any customary hydrolyzing acid can be employed. $H_2SO_4$ and HCl are quite satisfactory in this regard. After the hydrolysis step the customary purification techniques, such as extraction by solvent, fractional distillation, filtration, recrystallization from the solvent employed, etc., can be employed.

The invention will be further illustrated by the following examples:

EXAMPLE 1.—DIRECT CARBOXYLATION PROCEDURE AT ATMOSPHERIC PRESSURE USING AlCl₃ ALONE

A 500 ml. 3-necked flask was equipped with a rotary stirrer, condenser, and a carbon dioxide bubbling tube. The flask was then charged with 75 grams of anhydrous $AlCl_3$ and about 300 ml. of toluene, which had been previously dried over calcium sulfate then passed through a size 4-A molecular sieve. The reaction mixture was heated rapidly to about 110° C. and refluxed while the carbon dioxide gas was bubbled in for a period of approximately 4 hours. Heat was removed and the reaction mixture was allowed to cool. Then the flask was rinsed several times with toluene.

The resultant reaction products were then poured onto an ice-HCl mixture yielding two layers, one an acid-aqueous layer and the other an organic layer. After separation of the two layers, the aqueous layer was extracted twice with diethyl ether and this ether extract then added to the previously secured organic layer. The combined organic layer was then washed two times with 10% $Na_2CO_3$ solution and once with water. After separation of the organic and aqueous layers, the organic layer was discarded. The combined aqueous layers were shaken with a small amount of charcoal, filtered, and the resulting clear solution neutralized with 1.1 N sulfuric acid. A voluminous white precipitate (p-toluic acid) resulted. This precipitate was digested at 100° C. for a short period of time and then cooled. The recovery of p-toluic acid amounted to 3.6 grams, a yield of 4.8% based on aluminum chloride.

EXAMPLE 2.—DIRECT CARBOXYLATION PROCEDURE AT APPROXIMATELY 200 ATMOSPHERES OF PRESSURE USING AlCl₃ ALONE

A 100 ml. stainless steel bomb was charged with a Monel ball (for agitation) and 27 grams of aluminum chloride ($AlCl_3$) and 43 ml. of toluene were added. The bomb was closed, put on a shaker, and heated to 100° C. and pressured to 3000 p.s.i. (approximately 200 atmospheres) with carbon dioxide gas. The amount of carbon dioxide gas was approximately 1.0 mol (44 grams). The reaction mixture was allowed to shake at this temperature and pressure for about 3 hours. Then the bomb was cooled, vented, and the contents thereof poured onto an ice-HCl mixture. The reaction products were rinsed with diethyl ether, and the organic and aqueous layers separated. The aqueous layer was shaken twice with diethyl ether and the ether extract thereof was combined with the previously obtained organic layer to form a combined organic layer, which was retained. The aqueous extract was discarded. The retained organic layer was then washed twice with $Na_2CO_3$ solution yielding two layers, one an ether layer and the other a basic-aqueous layer. The ether layer was discarded and the aqueous layer retained. Then the aqueous layer was boiled to remove traces of diethyl ether, after which "Filter-Cel" was added, and the product was filtered. The product was then acidified with concentrated sulfuric acid to a pH less than 2. A white precipitate of p-toluic acid resulted. The acid solution was cooled, filtered, and washed with cold water. The precipitate was then dried in air followed by drying over $CaCl_2$ at 16 mm. of mercury. The weight of p-toluic acid was 6.2 grams, a yield of 22.5% based on $AlCl_3$.

EXAMPLE 3.—DIRECT CARBOXYLATION PROCEDURE CONDUCTED AT A PRESSURE OF ABOUT 2200 ATMOSPHERES USING AlCl₃ ALONE

A 255 ml. single end bomb was charged with a ¾″ steel ball (for agitation). To this reaction vessel 37 grams of anhydrous $AlCl_3$ was added and the bomb was evacuated. Then the bomb was charged with 123 grams of carbon dioxide, put on a high pressure system, heated to 110° C. and pressured to 33,000 p.s.i. (approximately 2,245 atmospheres) with 134 ml. of toluene. The bomb was shaken on automatic control for 12 hours then cooled at constant pressure. The mole ratio of carbon dioxide: toluene: $AlCl_3$ was 2.8:1.4:0.28. After allowing the bomb to cool it was vented and the dark brown toluene solution poured out. The reaction vessel was rinsed several times with toluene and the organic layers combined. These layers were then cooled in ice and poured over an ice-HCl mixture to hydrolyze and dissolve the aluminum salts. The organic layer was then separated from the aqueous solution and the aqueous solution extracted twice with diethyl ether. The combined organic layer was then washed twice with 10% sodium carbonate solution followed by a single washing with water. The combined aqueous layers were shaken with a small amount of charcoal, filtered, and the resulting clear solution neutralized with 1.1 N sulfuric acid. A voluminous white precipitate (p-toluic acid), digested at 100° C. for a short period of time and then cooled, was filtered by suction to yield 9.4 grams (24% yield) of p-toluic acid.

EXAMPLE 4.—USING AlCl₃ AND METALLIC ALUMINUM PARTICLES AT ATMOSPHERIC PRESSURE

A 500 ml., 3-necked flask was equipped with a bubbler, stirrer, condenser, and $CaCl_2$ desiccating tube. The flask was purged with dry nitrogen gas and then charged with 50 grams of anhydrous aluminum chloride, 10 grams of aluminum powder, and 250–300 ml. (about 2.4 mols) of toluene. The reaction mixture was heated to reflux in nitrogen atmosphere and then a stream of carbon dioxide was bubbled in for 3 hours at about 100–110° C. The flask and its contents were then cooled. The reaction products were poured over an ice-HCl mixture, and the aromatic acid was purified as indicated in Examples 1–3. Para-toluic acid in the amount of 11.6 grams (22.8% yield based on $AlCl_3$) was recovered after purification.

EXAMPLE 5.—USE OF 0.5 MOL OF ALUMINUM (ALCOA ATOMIZED GRADE 101) PER 1.0 MOL OF $AlCl_3$ AT A PRESSURE OF ABOUT 200 ATMOSPHERES

A 100 ml. bomb was charged with a stainless steel ball. Then 1.3 grams (0.05 mol) of aluminum powder (Alcoa "atomized grade 101"), 27 grams of aluminum chloride and 50 ml. of benzene were added to the bomb. The bomb was evacuated and heated to 100° C. and pressured to 3000 lbs. per square inch (approximately 204 atmospheres) with carbon dioxide gas. It was then shaken at this temperature for a period of 3 hours. Afterwards the bomb was cooled and its contents were vented into ice. The aluminum salts were dissolved with HCl and the product separated by three diethyl ether extractions. The diethyl ether layer was shaken twice with 150 ml. of 5% $Na_2CO_3$ solution, followed by shaking with water. The combined aqueous layer was boiled to remove the diethyl ether, cooled, and then purified with decolorizing carbon and "Super Cel." It was then filtered and the clear yellow filtrate was acidified with concentrated $H_2SO_4$. The precipitate was filtered by suction and dried over $CaCl_2$. The yield of benzoic acid was 9.7 grams after purification (39% yield based on $AlCl_3$). The neutral diethyl ether layer was dried over magnesium sulphate, charcoal filtered, and concentrated to 10 to 20 ml. at atmospheric pressure. The neutralized layer sulphate, charcoal filtered, and concentrated to 10 to 20 Distillation at 15 mm. of mercury gave a dark colored material.

EXAMPLE 6.—RUN AT APPROXIMATELY 200 ATMOSPHERES' PRESSURE—USING A MOL RATIO OF ALUMINUM TO $AlCl_3$ OF 1:1

The procedure indicated in Example 5 was duplicated except that 2.7 grams (0.1 mol) of Alcoa "atomized 101" aluminum particles were employed instead of 1.3 grams and toluene was used in place of benzene. The yield of para-toluic acid was 13.9 grams (50% yield based on $AlCl_3$).

EXAMPLE 7.—RUN AT APPROXIMATELY 200 ATMOSPHERES' PRESSURE AND A MOL RATIO OF ALUMINUM TO ALUMINUM CHLORIDE OF 2:1

The experiment indicated in Example 6 was repeated with the exception that 5.4 grams (0.2 mol) of Alcoa atomized grade 101 aluminum particles were employed. After purification the yield of para-toluic acid was 16.5 grams (60% yield).

EXAMPLE 8.—RUN AT 200 ATMOSPHERES AND A MOL RATIO OF ALUMINUM TO ALUMINUM CHLORIDE OF 1:2, AND USING PIGMENT GRADE MERCK ALUMINUM FLAKES

A 100 ml. test bomb was charged with a ¾" Monel ball. To the reaction vessel 27 grams of aluminum chloride (0.2 mol), 2.7 grams of aluminum (0.1 mol), and 50 ml. (0.5 mol) of toluene were added. The bomb was evacuated and heated to 110° C. and shaken. Then the bomb was pressured to 3000 lbs. per square inch (approximately 200 atmospheres) with carbon dioxide gas (about 1.2 mols). The bomb was shaken at 100° C. for about 3 hours and then cooled in ice water. Then the bomb was vented and the contents poured onto an ice-HCl mixture. The main part of the product was dissolved in diethyl ether and the diethyl ether layer was decanted. The aqueous layer was allowed to stand overnight to dissolve all the aluminum salts. The aqueous layer was extracted 3 times with diethyl ether and the extracts combined with the decanted solution. The product was purified and worked up in the customary manner. Para-toluic acid in the amount of 14.6 grams (53% yield) was recovered.

EXAMPLE 9.—RUN AT ABOUT 170 ATMOSPHERES OF PRESSURE USING AMALGAMATED 30 MESH ALUMINUM, AND A MOLE RATIO OF AMALGAMATED ALUMINUM TO ALUMINUM CHLORIDE OF 1.1:2

A 100 ml. bomb was charged with a stainless steel ball. Then 27 grams of anhydrous aluminum chloride, 3 grams of amalgamated 30 mesh aluminum and 50 ml. of toluene were added to the bomb. The materials were heated to 100° C. and pressured to 2500 lbs. per square inch with dry carbon dioxide gas. The bomb was allowed to shake for 3 hours and then cooled. The para-toluic acid was purified and worked up in the usual manner. The weight of para-toluic acid recovered was 8.2 grams (30% yield).

EXAMPLE 10.— RUN AT ABOUT 177 ATMOSPHERES USING 30 MESH "B & A" ALUMINUM WITH AN ALUMINUM TO ALUMINUM CHLORIDE MOLE RATIO OF 1:1

A 100 ml. bomb was purged with nitrogen gas and charged with a ¾" stainless steel ball. To the reaction vessel 2.7 grams of 30 mesh aluminum (B & A), 27.0 grams of aluminum chloride, and 50 ml. of toluene were added. The bomb was closed, evacuated, and heated to 100° C. with shaking. The bomb was then pressured to about 2600 lbs. per square inch (177 atmospheres) with dry carbon dioxide gas. The bomb was allowed to shake for about 4 hours during which time the pressure rose to 3700 lbs. per square inch. After cooling the bomb to room temperature, it was vented. The reaction products were then poured into an ice-HCl mixture and worked up and purified in the usual manner. The precipitate of para-toluic acid after drying over calcium chloride ($CaCl_2$) weighed 11.8 grams (44% yield).

EXAMPLE 11.—RUN AT 184 ATMOSPHERES USING MERCK ALUMINUM FLAKES AND AN ALUMINUM TO ALUMINUM CHLORIDE MOLE RATIO OF 1:1.

A 100 ml. bomb was purged with nitrogen gas and charged with a stainless steel ball. Then 2.7 grams of aluminum flakes (Merck), 27 grams of aluminum chloride, and 50 ml. of benzene were added to the reaction vessel. The bomb was heated to 100° C. and pressured to about 2700 p.s.i. (approximately 184 atmospheres) with carbon dioxide gas. The bomb was allowed to shake for a period of three hours during which the pressure dropped to around 2400 pounds per square inch. The bomb was then cooled to room temperature and vented. The reaction products were worked in the customary way, and the benzoic acid precipitate weighed 12.6 grams after drying with calcium chloride. This amounted to a 55% yield.

EXAMPLE 12.—USING ALUMINA, $Al_2O_3$, AT A PRESSURE OF ABOUT 300 ATMOSPHERES, AND AN ALUMINA TO ALUMINUM CHLORIDE RATIO OF 1:1.4 MOLES

A 100 ml. bomb was purged with nitrogen gas and charged with 15 grams of $Al_2O_3$ (Alcoa activated ¼"), 27 grams (0.2 mol) aluminum chloride, and 50 ml. of toluene. The bomb was closed, evacuated, and then heated to 100° C. while being pressured to 4500 lbs. per square inch (300 atmospheres) with cabon dioxide gas. The bomb was shaken for 3 hours and then cooled in water to 25° C. The bomb was then vented and its contents poured onto an ice-HCl mixture. The product was extracted 3 times with diethyl ether and worked up and purified in the usual manner. The weight of dried para-toluic acid was 5.7 grams (21% yield based on $AlCl_3$).

EXAMPLE 13.—USING ZINC, AT A PRESSURE OF 272–340 ATMOSPHERES, AND A MOL RATIO OF ZINC TO ALUMINUM CHLORIDE OF 1:1

A 100 ml. bomb was charged with a ¾" stainless steel ball. Then 6.5 grams (0.1 mol) of zinc, 27 grams of aluminum chloride, and 50 ml. of toluene were added. The bomb was closed, evacuated, and heated to 100° C. while being pressured to 4000 to 5000 pounds per square inch (272 to 340 atmospheres) with carbon dioxide gas. The reaction was allowed to run for about 3 hours, after which time the bomb was cooled to 0° C. in ice, then slowly vented in upright position. The product was worked up and purified in the usual manner resulting in 6.1 grams (23% yield) of para-toluic acid.

We claim:

1. The method of carboxylating the benzene ring of an aromatic monocyclic compound which comprises heating said compound and carbon dioxide under substantially anhydrous conditions in the presence of aluminum chloride and a metal selected from the group consisting of aluminum, and zinc.

2. The method as recited in claim 1 wherein the metal is aluminum.

3. The method of claim 2 wherein superatmospheric pressure is employed during heating.

4. The method of claim 3 in which the metallic aluminum is present in the form of finely divided particles.

5. The process of preparing monocyclic, monocarboxylic aromatic acids by direct carboxylation of aromatic nuclei which comprises heating a monocyclic aromatic compound and carbon dioxide at a temperature of about 25° to about 250° C. and under substantially anhydrous conditions in the presence of aluminum chloride and finely divided particles of a metal selected from the group consisting of aluminum and zinc, then hydrolyzing the reaction product.

6. The process according to claim 5 wherein the hydrolysis is performed in acid media.

7. The process according to claim 5 wherein the metal particles are aluminum.

8. The process of claim 5 wherein the aromatic compound is employed in molar excess.

9. The process of claim 5 wherein the carbon dioxide is employed in molar excess.

10. The process of claim 5 wherein superatmospheric pressure is employed during heating.

11. The process of claim 5 wherein said aromatic compound is a monocyclic aromatic hydrocarbon.

12. The process of claim 11 wherein said monocyclic aromatic hydrocarbon is benzene.

13. The process of claim 11 wherein said monocyclic aromatic hydrocarbon is toluene.

14. The process according to claim 5 wherein the carbon dioxide is employed in the gaseous state.

15. The process as in claim 7 wherein the heating is accomplished at temperatures of about 90° to about 120° C.

16. The process according to claim 10 wherein a pressure of about 50 to about 2000 atmospheres is employed during heating.

17. The process according to claim 7 wherein the particle size of the finely divided aluminum does not exceed a maximum of 30 mesh.

18. The process according to claim 5 wherein said aluminum halide is employed in molar excess as compared to equimolar amounts.

19. The process according to claim 5 wherein said metal particles are employed in molar excess as compared to equimolar amounts.

References Cited in the file of this patent

UNITED STATES PATENTS

| | | |
|---|---|---|
| 1,866,717 | Meyer et al. | July 12, 1932 |
| 2,948,750 | Blaser et al. | Aug. 9, 1960 |